United States Patent [19]
McAlister

[11] Patent Number: 5,363,804
[45] Date of Patent: Nov. 15, 1994

[54] CUSHION FOR A HOUSEHOLD PET

[76] Inventor: John McAlister, 216 Olin Slice Rd., Chapin, S.C. 29036

[21] Appl. No.: 97,400

[22] Filed: Jul. 23, 1993

[51] Int. Cl.$^5$ ............................................. A01K 29/00
[52] U.S. Cl. .................................................. 119/25.5
[58] Field of Search ..................... 119/28.5; 5/337, 355

[56] References Cited

U.S. PATENT DOCUMENTS

| | | | |
|---|---|---|---|
| 1,569,710 | 1/1926 | Burt | 119/28.5 |
| 3,066,646 | 12/1962 | Bramley | 119/28.5 |
| 3,638,255 | 2/1972 | Sterrett | 5/337 |
| 3,900,648 | 8/1975 | Smith | 5/337 |
| 3,902,456 | 9/1975 | David | 119/28.5 |
| 4,008,688 | 2/1977 | Nicholas | 119/28.5 |
| 4,184,237 | 1/1980 | Blankenship | 5/355 |
| 4,649,861 | 3/1987 | Elkins et al. | 119/28.5 |
| 5,002,014 | 3/1991 | Albin | 119/28.5 |
| 5,144,911 | 9/1992 | Moore et al. | 119/28.5 |
| 5,197,411 | 3/1993 | Schwarzenhart | 119/28.5 |

FOREIGN PATENT DOCUMENTS

| | | | |
|---|---|---|---|
| 528660 | 2/1993 | European Pat. Off. | 119/28.5 |
| 8600781 | 2/1986 | WIPO | 119/28.5 |

Primary Examiner—Gene Mancene
Assistant Examiner—Thomas Price
Attorney, Agent, or Firm—Michael A. Mann

[57] ABSTRACT

The present invention is a cushion for a pet, preferably a cat, comprising a pad of a plurality of layers of raw unwoven polyester. Each layer comprises a solid first fiber and a second fiber that has a core and a sheath surrounding the core. The sheath has a lower melting temperature than the core. The pad is then heated to the temperature, where the sheath of the second fiber melts and sticks to the adjacent fiber, whether a first or a second fiber, and then cooled until the second fiber solidifies, attached to the adjacent fiber. The resulting material is a matted web of layered fibers that is subsequently cut into a pad of suitable size, such as large enough to accommodate a sleeping cat. The edge of the pad is bound by sewing or heat treatment.

27 Claims, 2 Drawing Sheets

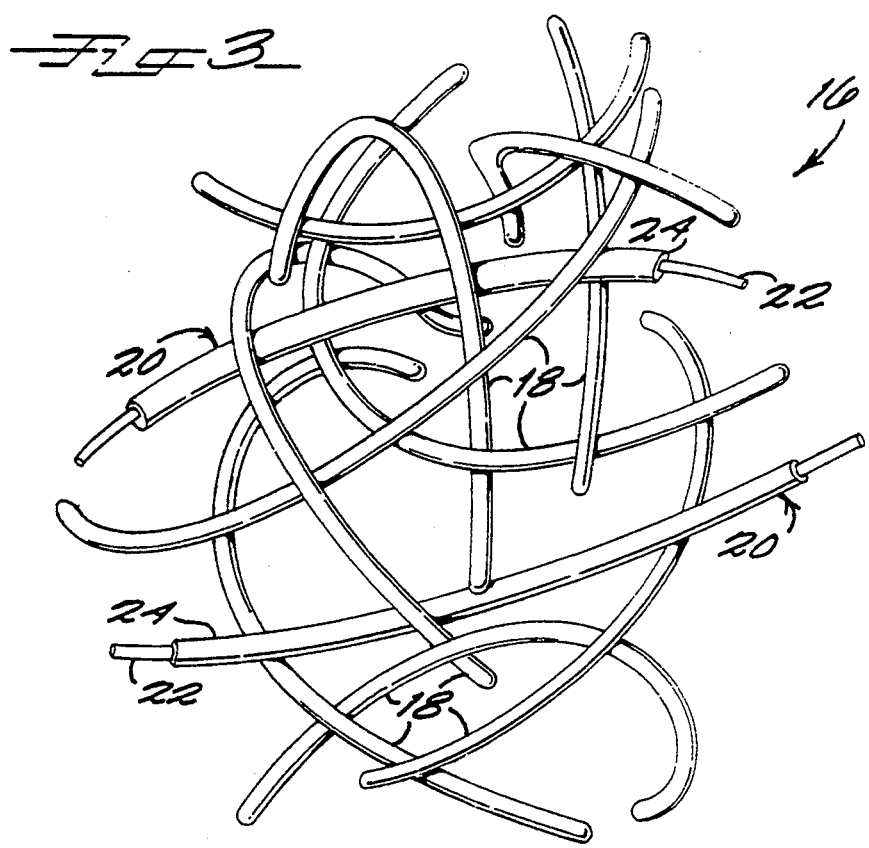

CUSHION FOR A HOUSEHOLD PET

BACKGROUND OF THE INVENTION

1. Field of the Invention

This invention relates to a cushion for a pet. More specifically, the invention relates to a cushion that attracts a cat.

2. Discussion of Background

People find comfort in having domestic pets, such as dogs and cats. Cats, in particular, are sometimes preferred as pets because many people believe they are easier to care for than dogs. Cats are, however, notoriously independent and curious. They have a tendency to go where they please and to nap on furniture or beds as they please. This habit of napping on beds and furniture can be a problem, especially if a cat has an odor, has fleas, sheds or if an occupant of the household is allergic to cats.

Pet owners will often purchase cushions for their pets in an attempt to provide a comfortable place for the animal to nap as an alternative to furniture and beds. Typically, these cushions are padded and covered in a fabric. Sometimes these are accepted by animals and sometimes not.

A variety of pet beds, pads, or cushions are available for domestic animals. U.S. Pat. No. 3,902,456 granted to David features a cloth-covered cushion, U.S. Pat. No. 5,144,911 granted to Moore, et al. feature water repellent NYLON-covered, U.S. Pat. No. 5,002,014 granted to Albin feature woven polyester strands coated with polyvinyl chloride, and U.S. Pat. No. 3,066,646 granted to Bramley feature polyvinyl chloride reinforced with a web of polyethylene terephthalate.

Other beds are available that feature multiple layers. U.S. Pat. No. 4,649,861 granted to Elkins, et al. describe a three-layered pet mat. U.S. Pat. No. 1,569,710 granted to Burt describe a one-piece pet mat made of an absorbent material, preferably chenille, which is a velvety material having standing wool or silk "fingers".

Pet cushions are also available with insect repellent coatings. U.S. Pat. No. 4,008,688 granted to Nicholas and U.S. Pat. No. 1,569,710 granted to Burt disclose impregnating or saturating a pet cushions with insecticides. U.S. Pat. No. 3,902,456 granted to Elkins, et al. alternatively use an adhesive in conjunction with an intermediate cushion layer to trap insects.

Despite the availability of cushions for pets, there remains a need for a cushion that a cat or other domestic animal will prefer to beds and furniture.

SUMMARY OF THE INVENTION

According to its major aspects and broadly stated, the present invention is a cushion for domestic animals, particularly for cats. The cushion comprises a pad made of a number of layers of fibers, preferably of raw, unwoven polyester fibers. Each layer comprises a plurality of first polyester fibers that are solid and a plurality of second polyester fibers that each have a core and a sheath. A plurality of layers of fibers of first and second fibers is formed by strewing both kinds at random onto a surface. After the layers of fibers are formed into a pad of suitable thickness, the pad is heated to a temperature at which the sheath of second fiber melts against an adjacent fiber, which could be a first or a second fiber, and is then cooled until the second fiber solidifies. When it does, it sticks to the adjacent fiber. The thermally-induced attachment of the fibers gives the pad a webbed or matted finish and good resilience. The fiber layers are cut into a pad dimensioned to be large enough to accommodate a sleeping pet. Then the edge of the pad is bound by sewing or heat treatment to preserve its geometric integrity. The pad is then placed on the floor (or on furniture as a protective cover) where the cat owner wants the cat to nap.

An important feature of the present invention is the combination of the texture and resilience of the pad. The feel of the spaced fibers of the pad and its resilience attracts cats and seem to fascinate them. The attraction provided by the pad for cats thus gives the cat owner a measure of control over the cat because the cat owner can use the cushion to decide where he or she wants the cat to nap.

Another important feature of the present invention is the material of which the cushion is made, namely, raw, unwoven polyester, which is easily cleaned and stain-resistant, and maintains its resilience. Moreover, this material has two properties that make it ideal for the present use as a cushion for a pet: it is naturally electrostatic (cationic) and it is a thermal insulator. Because it is electrostatic, cat hairs and dander tend to cling to this material rather than be spread over the house. Its insulating characteristic keeps the pet warm yet permits air flow and is therefore more comfortable to the pet than fabric-covered cushions.

Other features and advantages will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 3 is a detailed view of first and second fibers according to a preferred embodiment of the present invention.

DETAILED DESCRIPTION OF A PREFERRED EMBODIMENT

The present invention, in the preferred embodiment, is a pet cushion, preferably for cats, that has a texture and resilience attractive to cats. The present invention gives the pet owner a tool to effectively define the cat's napping place, and in so doing, making other areas less desirable for napping. In some respects the present invention is also a novelty for cat owners who enjoy watching cats respond to their environment and furnishing maximum comfort for their pet.

Figure 1:
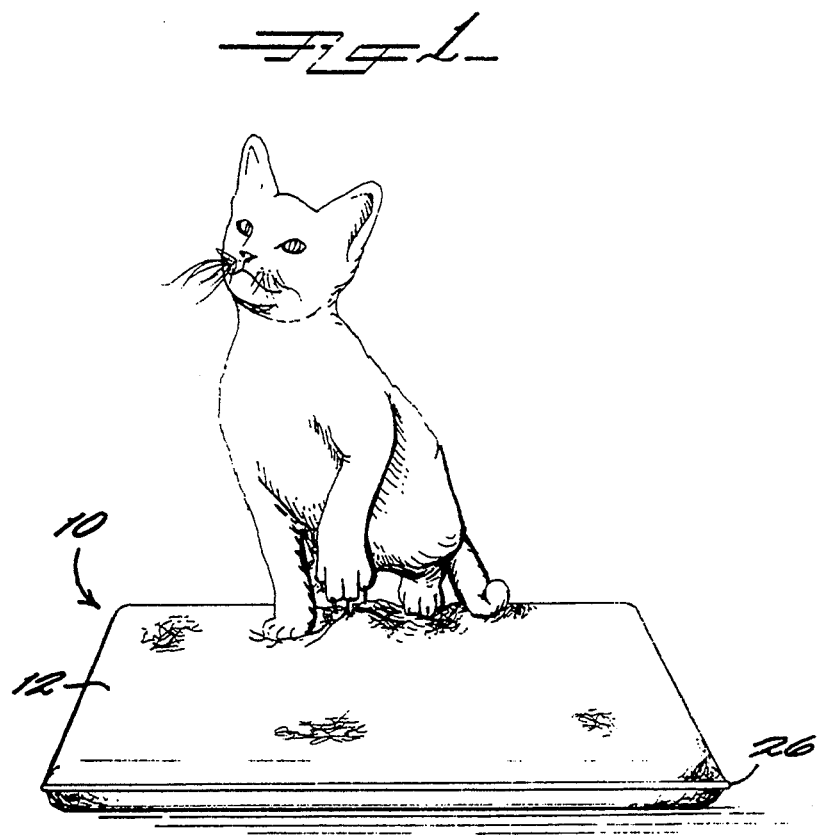
FIG. 1 is a perspective drawing of a cushion according to a preferred embodiment of the present invention.
Figure 2:
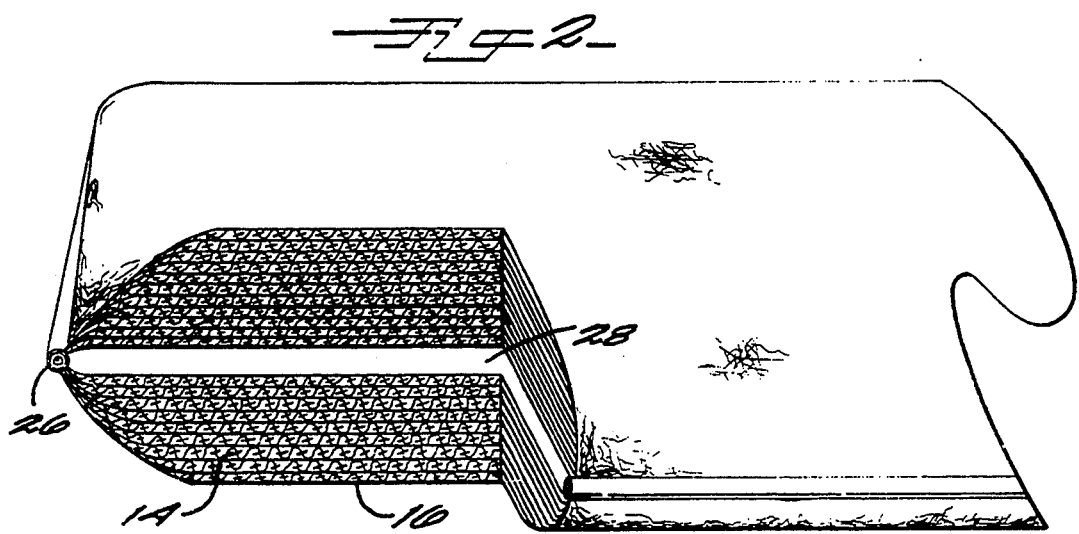
FIG. 2 is a cross sectional view of the cushion of FIG. 1 showing an inner layer according to a preferred embodiment of the present invention.

Referring now to FIGS. 1, 2 and 3, the present invention is illustrated in a preferred embodiment, namely, a cushion generally indicated by reference numeral 10, preferably for cats but suitable for use by other domestic animals. Cushion 10 in its simplest embodiment comprises a pad 12 having a multiplicity of layers 14 of fibers 16, preferably fibers of raw, unwoven polyester. Each layer 14 comprises a plurality of first fibers 18 and a plurality of second fibers 20. Preferably, first fibers 18 comprise approximately 80% by weight of pad 12 and are preferably solid, 15 Denier, polyester fibers, such as that manufactured by Hearst Cellanese. Second fibers 20 comprise preferably 20% of pad 12. Each second fiber 20 has a core 22, which is preferably a 2 Denier, polyester fiber, and a sheath 24, preferably a 2 Denier, bi-component copolymer having a low melting temperature, surrounding core 22.

Pad 12 is formed by randomly placing a mixture of first fibers and second fibers on a surface to form a first layer 14 of a plurality of layers 14. Another layer 14 is placed over the first layer 14, and so on. In the preferred embodiment, them are between twenty-five and forty layers required to form a pad of approximately two inches in thickness. Pad 12 is then heated to a temperature where sheaths 24 of second fibers 20 begin to melt against an adjacent fiber of either type: first fiber 18 or second 20. Pad 12 is then cooled. When cooled, sheath 24 of the second fiber 20 solidifies, sticking against the adjacent fiber. Heating followed by cooling gives pad 12 a structure that is highly porous and mat-like, rather than woven, and a resilience. This structure, in the form of a cushion about two inches thick, is highly attractive to cats as it is, without coverings, other layers or any further processing except to bind the edges of pad 12.

Pad 12 should be made large enough to accommodate a large housecat in a sleeping position, preferably in the form of a square with dimensions of at least 20 inches on a side and a thickness in the range of one-and-one-half to two inches. Pad should not be covered with a fabric. A fabric is a barrier to fibers 16 that comprise layers 14 which are an important aspect of the texture of cushion 10. This texture in combination with the resilience of pad 12 attracts and holds the attention of cats.

The edge 26 of pad 12 is preferably finished or bound by heat treatment or by sewing so that cushion 10 maintains its geometric integrity, that is, fibers 16 are not readily pulled loose so that, gradually, cushion 10 loses its shape.

Pad 12 may also be made with an inner layer 28 (FIG. 2) that can be impregnated with one or more of a variety of compounds, such as a non-toxic, flea retardant chemical. Alternatively, inner layer 28 can be impregnated with a different pesticide, a deodorizer, a fragrance or even cat-nip.

In use, cushion 10 is preferably placed within an area of the home where the owner wants the cat to nap, such as a comer of a kitchen or porch. Alternatively cushion 10 can be secured to an upright object such as a scratching post. Periodically, cushion 10 can be laundered or simply replaced with a new one.

The texture and resilience of cushion 10 appears to attract a cat. A cat will approach cushion 10 out of curiosity and test its surface with a paw. The cat will then climb onto cushion 10 and repeatedly pat its surface as if to test the resilience. The cat will then lie down on the surface and find it more comfortable because of it insulates without preventing air flow through it. Its electrostatic property causes it to retain cat hairs and dander. Because of the curiosity, almost to the point of fascination, exhibited by cats for cushion 10 and its comfort, cushion 10 gives to cat owners a measure of control over their pets and where they nap. The owner can then determine where the cat will nap by placing cushion 10 at that location. The cat's and the owner's interests become aligned.

It will be apparent to those skilled in the art from a careful reading of the detailed description of the foregoing preferred embodiments that many modifications and substitutions can be made in the foregoing without departing from the spirit and scope of the invention. The present invention, moreover, is not limited to the specific example of uses given but, rather, is defined by the appended claims.

What is claimed is:

1. An article for use as a cushion for a pet, said article consisting essentially of:
    a pad made of matted, resilient fibers formed in layers, said pad being approximately one-and-one-half to approximately two inches thick and having an edge; and
    a binding carried by said edge.

2. The article as recited in claim 1, wherein said fibers are naturally electrostatic.

3. The article as recited in claim 1, wherein said fibers are thermally insulating.

4. The article as recited in claim 1, wherein said fibers are made of raw, unwoven polyester.

5. The article as recited in claim 1, wherein said pad comprises approximately 25 to 40 layers of raw, unwoven polyester fibers.

6. The article as recited in claim 1, wherein said fibers further comprise a first fiber and a second fiber, said second fiber having a core and a sheath, said sheath comprising a low melt polyester.

7. The article as recited in claim 1, wherein said fibers include approximately 80% by weight of a first polyester fiber and approximately 20% by weight of a second fiber, said second polyester fiber having a core and a sheath, said sheath comprising a low melt polyester.

8. The article as recited in claim 1, wherein said pad further comprises an inner layer, said inner layer impregnated with a nontoxic, flea retardant chemical.

9. The article as recited in claim 1, wherein said pad further comprises an inner layer, said inner layer treated with a pesticide.

10. The article as recited in claim 1, wherein said pad further comprises an inner layer, said inner layer treated with a deodorizer.

11. The article as recited in claim 1, wherein said cushion is dimensioned for a sleeping cat, said surface at least approximately twenty inches square.

12. A method for making a cushion for a cat, said method comprising the steps of:
    strewing said raw unwoven polyester in a series of layers having a thickness;
    heating said series of layers to a first temperature;
    cooling said series of layers;
    cutting said series of layers into a pad, said pad having a shape and a density, said shape having a surface and an edge; and
    treating said edge of said pad so as to maintain the dimensional integrity of said pad.

13. The method as recited in claim 12, wherein said treating step further comprises the step of sewing said edge.

14. The method as recited in claim 12, wherein said treating step further comprises the step of heating said edge to bind said fibers.

15. The method as recited in claim 12, further comprising the. steps of:
    impregnating a material with a non-toxic, flea retardant chemical; and
    placing said material among said layers so that it does not directly contact said cat when said cat lies on said pad.

16. An article for use as a cushion for a pet, said article consisting essentially of:
    a pad made of matted, resilient fibers, said pad having an edge, said resilient fibers including a first fiber and a second fiber, said second fiber having a core and a sheath, said sheath comprising a low melt polyester; and a binding carried by said edge.

17. The article as recited in claim 16, wherein said fibers are naturally electrostatic.

18. The article as recited in claim 16, wherein said fibers are naturally electrostatic.

19. The article as recited in claim 16, wherein said fibers are made of raw, unwoven polyester.

20. The article as recited in claim 16, wherein said pad is made of raw, unwoven polyester approximately one-and-one-half to approximately two inches thick.

21. The article as recited in claim 16, wherein said fibers are formed in layers, said pad being approximately one-and-one-half to approximately two inches thick.

22. The article as recited in claim 16, wherein said pad comprises approximately 25 to 40 layers of raw, unwoven polyester fibers.

23. The article as recited in claim 16, wherein said fibers include approximately 80% by weight of a first polyester fiber and approximately 20% by weight of a second fiber, said second polyester fiber having a core and a sheath, said sheath comprising a low melt polyester.

24. The article as recited in claim 16, wherein said pad further comprises an inner layer, said inner layer impregnated with a non-toxic, flea retardant chemical.

25. The article as recited in claim 16, wherein said pad further comprises an inner layer, said inner layer treated with a pesticide.

26. The article as recited in claim 16, wherein said pad further comprises an inner layer, said inner layer treated with a deodorizer.

27. The article as recited in claim 16, wherein said cushion is dimensioned for a sleeping cat, said surface at least approximately twenty inches square.

* * * * *